United States Patent
Liu

(10) Patent No.: US 11,647,429 B2
(45) Date of Patent: May 9, 2023

(54) CALL PROCESSING METHOD, CALL PROCESSING APPARATUS AND STORAGE MEDIUM

(71) Applicant: BEIJING XIAOMI MOBILE SOFTWARE CO., LTD., Beijing (CN)

(72) Inventor: Yongqi Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 76 days.

(21) Appl. No.: 17/446,295

(22) Filed: Aug. 28, 2021

(65) Prior Publication Data

US 2022/0286920 A1    Sep. 8, 2022

(30) Foreign Application Priority Data

Mar. 8, 2021 (CN) .......................... 202110251103.5

(51) Int. Cl.
H04W 36/00 (2009.01)
H04W 76/30 (2018.01)

(52) U.S. Cl.
CPC ....... *H04W 36/0022* (2013.01); *H04W 76/30* (2018.02)

(58) Field of Classification Search
CPC . H04W 36/0022; H04W 76/30; H04W 76/34; H04W 36/14; H04W 76/27
USPC .................................. 370/331; 455/436–445
See application file for complete search history.

(56) References Cited

U.S. PATENT DOCUMENTS

| 2010/0165940 | A1  | 7/2010 | Watfa et al. |
| 2012/0002545 | A1* | 1/2012 | Watfa ..................... H04W 48/06 370/328 |
| 2016/0066218 | A1* | 3/2016 | Basavarajappa .. H04W 36/0022 370/331 |
| 2016/0219503 | A1  | 7/2016 | Kim et al. |
| 2016/0278105 | A1* | 9/2016 | Ng ........................ H04W 68/12 |

FOREIGN PATENT DOCUMENTS

| CN | 102893668 A    | 1/2013 |
| KR | 20160089875 A  | 7/2016 |
| WO | 2019061251 A1  | 4/2019 |

OTHER PUBLICATIONS

Extended European Search Report in Application No. 21195644.6, dated Feb. 21, 2022.
China first office action in Application No. 202110251103.5, dated May 2, 2022.

* cited by examiner

*Primary Examiner* — Michael Y Mapa
(74) *Attorney, Agent, or Firm* — Syncoda LLC; Feng Ma

(57) ABSTRACT

A call processing method includes: determining that a circuit switched fallback (CSFB) call establishing process performed by the terminal is suspended, and a release message of radio resource control (RRC) connection redirected to a circuit domain is received, and determining a current communication state of the CSFB call; and cancelling transmitting an extended service request (ESR) message to be retransmitted currently, in response to determining that the current communication state of the CSFB call meets a condition for canceling a retransmission mechanism of the ESR message.

20 Claims, 7 Drawing Sheets

CALL PROCESSING METHOD, CALL PROCESSING APPARATUS AND STORAGE MEDIUM

CROSS-REFERENCE TO RELATED APPLICATION

This application claims priority to Chinese Patent Application No. 202110251103.5 filed on Mar. 8, 2021, the disclosure of which is hereby incorporated by reference in its entirety.

BACKGROUND

In related technologies, major operators implement voice and video calls through IP Multimedia Subsystem (IMS). However, in terms of the coverage of voice and video calls, comparing a Long-Term Evolution (LTE) technology with a Circuit Switched (CS) network (also referred to as a CS domain), the coverage of the CS domain is relatively large.

SUMMARY

The present disclosure relates generally to the field of communication technologies, and more specifically to a call processing method, a call processing apparatus and a storage medium.

According to a first aspect of the embodiments of the present disclosure, there is provided a call processing method applied to a terminal, and the method includes:

determining that a circuit switched fallback (CSFB) call establishing process performed by the terminal is suspended, and a release message of radio resource control (RRC) connection redirected to a circuit domain is received, and determining a current communication state of the CSFB call; and cancelling transmitting an extended service request (ESR) message to be retransmitted currently, in response to determining that the current communication state of the CSFB call meets a condition for canceling a retransmission mechanism of the ESR message.

According to a second aspect of the embodiments of the present disclosure, there is provided a call processing apparatus, including:

a processor; and a memory device for storing processor-executable instructions; wherein the processor is configured to execute the call processing method described in the first aspect or any of the embodiments of the first aspect.

According to a third aspect of the embodiments of the present disclosure, there is provided a storage medium having stored therein instructions that, when executed by a processor of a terminal, enabling the terminal to execute the call processing method described in the first aspect or any one of the embodiments of the first aspect.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this disclosure, illustrate embodiments consistent with the disclosure and, together with the description, serve to explain the principles of the disclosure.

DETAILED DESCRIPTION

Figure 1:
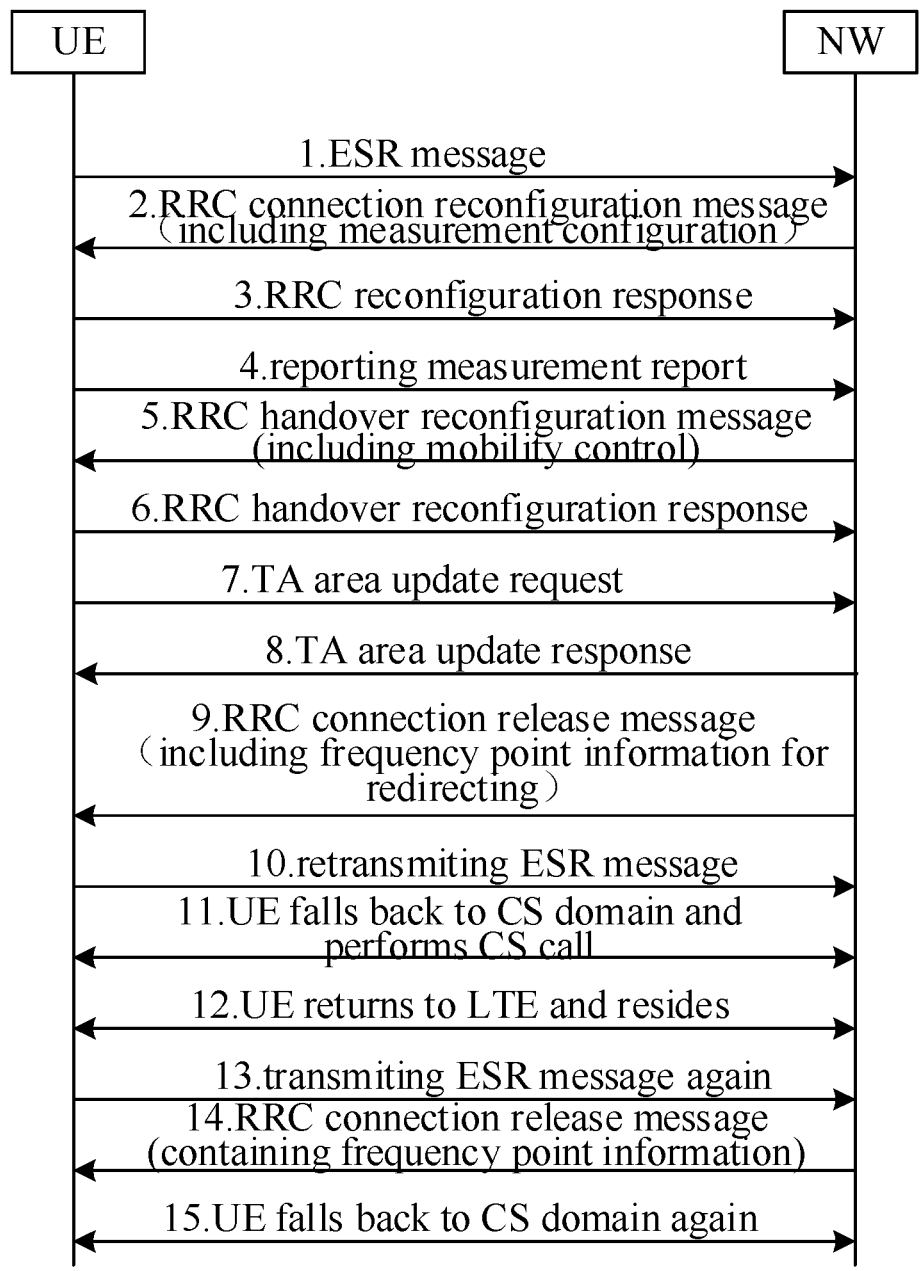
FIG. 1 is an interaction flowchart showing multiple retransmissions of ESR messages by a UE according to some embodiments.

Description will now be made in detail to exemplary embodiments, examples of which are illustrated in the accompanying drawings. The following description refers to the accompanying drawings in which the same numbers in different drawings represent the same or similar elements unless otherwise indicated. The implementations in the following description of exemplary embodiments do not represent all implementations consistent with the present disclosure. Instead, they are merely examples of apparatuses and methods consistent with some aspects of the disclosure as detailed in the appended claims.

When a User Equipment (UE) is registered in LTE through a joint registration method and is not registered to a voice service over long-term evolution (Voice over Long-Term Evolution, VoLTE), or when the UE does not support VoLTE, or when the current Public Land Mobile Network (PLMN) does not support VoLTE, it needs to fall back to the CS domain to implement call services. Herein, the UE falls back to the CS domain to perform a call service, which needs to be triggered by transmitting an Extended Service Request (ESR) message.

In related technologies, network operations of major operators can gradually implement voice and video calls through IMS. However, in terms of the coverage of voice and video calls, comparing LTE with the CS domain, the coverage of the CS domain is still relatively large. Therefore, the CS domain is still a supplement to voice calls.

When the UE registers a cell through the joint registration method, in any case that the UE is registered in LTE and is not registered to VoLTE, or the UE does not support VoLTE, or the current PLMN of the UE does not support VoLTE, a calling or called occurs, and it is determined that a Circuit Switched Fallback (CSFB) call is performed. In related technologies, the implementation of CS domain calls of some operators is that the UE transmits an ESR message to trigger the UE to fall back to the CS domain. After receiving the ESR message, the network side may transmit a measurement configuration of the CS domain frequency point to the UE, and then redirect to the CS domain signaling according to the reported signal strength configuration, or the network side may directly issue the frequency points of the neighboring cell of the CS domain near the current location of the UE to the UE, instructing the UE to select an available CS domain. The frequency of the zone is issued to the UE to instruct the UE to select an available CS domain. The UE selects an appropriate frequency point to reside in the CS domain according to the network residence strategy, and continues the CSFB call. However, when the UE is triggered by the ESR message to fall back to the CS domain, the ESR message may be suspended, and the UE may be caused to repeatedly transmit the ESR message. The UE repeatedly transmitting ESR messages may cause the UE to fall back to the CS domain again, making it difficult for the UE to use service data normally via LTE.

However, in related technologies, in accordance with regulations of relevant rules, for example, as stipulated in 5.6.1.6 of the 3rd Generation Partnership Project (3GPP) document TS 24.301, in the CSFB call establishment process, if other processes that suspends the CSFB call establishment process occur, for example, a Tracking Area update (TAU) process occurs, it is determined to stop the time keeping to the CSFB call establishment process by the T3417 or T3417ext timer. In other words, the UE can suspend the CSFB call establishment process and start the TAU process by stopping the time keeping to the CSFB call establishment process by the T3417 or T3417ext timer. In addition, after the suspension of other processes (such as the TAU process) that suspends the CSFB call establishment process, the Radio Resource Control (RRC) connection is reserved, and at this time, the UE continues to retransmit the ESR message.

However, if after the TAU process ends and before the ESR message is retransmitted, the UE receives the RRC Connection Release message issued by the network, and the RRC Connection Release message contains the redirected frequency point. At this time, the UE directly enters the CS domain, and in the process of falling back to select the network when the UE enters the CS domain, the UE retransmits the ESR message to the network. Since the UE has received the RRC Connection Release message sent by the network before retransmitting the ESR message, and disconnected the RRC connection based on the RRC Connection Release message, the UE may fail to transmit the ESR message and cannot complete the transmission.

When the UE falls back to the CS domain and completes the voice call process, the UE returns to LTE through Fast Return (FR). Since the UE falling back to the CS domain is not triggered via transmitting an ESR message by the UE, after the retransmission of the ESR message fails, the UE will retransmit the ESR message. The network issues an RRC Connection Release message according to the received ESR message, and the RRC Connection Release message carries the frequency points of the CS domain. The UE falls back to the CS domain again according to receiving the RRC Connection Release with the frequency points of the CS domain. At this time, the UE has completed the CSFB call, and the UE does not need to fall back to the CS domain again.

The UE being triggered to fall back to the CS domain by transmitting an ESR message and the processing flow of the process being suspended can be seen in FIG. 1. FIG. 1 is an interaction flowchart showing multiple retransmissions of ESR messages by a UE according to some embodiments. As shown in FIG. 1:

In step 1, the UE transmits an ESR message. Further, when the user equipment UE is registered in LTE through joint registration method and is not registered to VoLTE, or the UE does not support VoLTE, or the current PLMN does not support VoLTE, at this time, if a calling or called occurs, the UE transmits an ESR message to the network, to request falling back to the CS domain to perform telephone services.

In step 2, the network transmits an RRC connection reconfiguration message (meas Config). Further, the network did not immediately release the RRC connection and redirect the UE to the CS domain, but sent an RRC measurement reconfiguration message to the UE, where the RRC measurement reconfiguration message carries the measurement configuration of the LTE neighboring cell, and the measurement configuration is used for the UE to measure the frequency point of the CS domain so as to determine an available CS domain.

In step 3, the UE transmits an RRC reconfiguration response (RRC Connection Reconfiguration Complete) to the network.

In step 4, the UE reports a Measurement Report (A4 Event) to the network. The measurement report can be an A4 event.

In step 5, the network transmits an RRC connection reconfiguration message (RRC Connection Reconfiguration). Herein, as shown in FIG. 1, the RRC Connection Reconfiguration message contains a mobility control message (mobility Control Info) for instructing the UE to perform a handover operation. In other words, according to the A4 event reported by the UE, the network transmits an RRC Connection Reconfiguration message containing mobility Control Info to instruct the UE to switch to a cell with relatively good signal strength, such as a LTE neighboring cell with better Reference Signal Receiving Power (RSRP).

In step 6, the UE transmits an RRC handover reconfiguration response (RRC Connection Reconfiguration Complete).

In step 7, the UE transmits a TA area update request (Tracking Area Update Request) to the network. When the UE detects that the current cell TAC is not in the TA List (List) configured for the UE by the network, it initiates a TAU request (Tracking Area Update Request) to request to update the registered area.

In step 8, the network transmits a TAU response (Tracking Area Update Accept). The network issues the updated TA List to the UE to complete the update of the location area.

In step 9, the network transmits an RRC connection release message (RRC Connection Release (redirected Carrier Info)). The RRC connection release message issued by the network carries frequency point information for redirecting to the CS domain.

In step 10, the UE retransmits the ESR message (Retry 1). According to section 5.6.1.6 of the 3GPP document TS 24.301, in the ESR message process, if a TAU process occurs, the UE suspends the ESR process, and reserves the RRC connection, after the TAU is completed, to continue to retransmit the ESR message. However, at this time the RRC connection has been released by the network (caused by step 9), the UE is in the CS domain redirection process, and the ESR message retransmission fails. This is the first time that the ESR message is retransmitted.

In step 11, the UE falls back to the CS domain, and executes the call process of the CS domain (Fallback to CS domain and perform CS call).

In step 12, after the CS domain call ends, the UE returns to LTE again and resides on the LTE cell (Return to LTE).

In step 13, the UE transmits an ESR message (Retry 2) again. Since the transmission of the ESR message failed in step 10, the UE retransmits the ESR message again. This is the second time that the ESR message is retransmitted.

In step 14, the network transmits an RRC connection release message (RRC Connection Release (redirected Carrier Info)). The message contains the frequency point information redirected to the CS domain.

In step 15, the UE falls back to the CS domain (Fallback to CS domain) again. It should be noted that there is no requirement for the CS domain call service at this time.

Further combining the above-mentioned embodiment and FIG. 1, in a CSFB call, the CSFB call establishment process (the CSFB call establishment process can also be referred to as the ESR process) is suspended by the TAU, and the UE receives, after the TAU process ends, the RRC connection release message with the redirected frequency point issued by the network, which cause the ESR message to fail to be sent normally twice. As a result, after the CSFB call ends, it falls back to the CS domain abnormally again. Therefore, after the CSFB call ends, the UE is affected to use the data service normally via LTE, and the communication service after the CSFB call is affected.

In view of this, the present disclosure provides a call processing method. In the case that the UE is registered in LTE through the joint registration method and not registered to VoLTE, or the UE does not support VoLTE, or the current PLMN of the UE does not support VoLTE, the calling or called occur. During this CSFB call establishment process, if the CSFB call establishment process is suspended, the UE may repeatedly transmit the ESR message multiple times, causing the UE to fall back to the CS domain multiple times. In the embodiments of the present disclosure, each time the UE repeatedly transmits the ESR message, the UE may be triggered to fall back to the CS domain, or the UE may not be triggered to fall back to the CS domain. Further, the UE repeatedly transmits the ESR message multiple times. In an embodiment, in response to the UE being in the RRC connected state to transmit the ESR message and it being determined that the ESR message has been sent successfully, the UE is triggered to fall back to the CS domain. In an embodiment, in response to the UE being in the RRC disconnected state to transmit the ESR message and it being determined that the ESR message has failed to be transmitted, the UE cannot fall back to the CS domain. In view of the problems involved in the foregoing embodiments, the present disclosure proposes to add at least one execution step, for determining the conditions for canceling the ESR message retransmission mechanism, to the CSFB call establishment process. The UE decides to cancel the ESR message retransmission mechanism according to the conditions for canceling the ESR message retransmission mechanism, so as to avoid the possibility of falling back to the CS domain multiple times during one CSFB call establishment process. In addition, the present disclosure proposes two embodiments for canceling the ESR message retransmission mechanism.

An embodiment is that after the TAU process of suspending the CSFB call establishment process ends, in the manner of a flag bit, it is determined to cancel the repeated transmitting of the ESR message after receiving the RRC connection release message. Another embodiment is that after receiving the RRC connection release message, it is determined that the cell to which the UE belongs is a CS domain cell, and it is determined to cancel the repeated transmitting of ESR messages.

Through the call processing method provided by the present disclosure, it is possible to avoid the problem that the UE falls back to the CS domain multiple times due to the retransmission of the ESR message, resulting in that the UE cannot normally use the LTE to access high-speed Internet. After the CSFB call is over, the UE can quickly return to LTE, to ensure users to normally use data services and improve users' online experience.

In the embodiments of the present disclosure, the call processing method will be further described with reference to the accompanying drawings.

Figure 2:
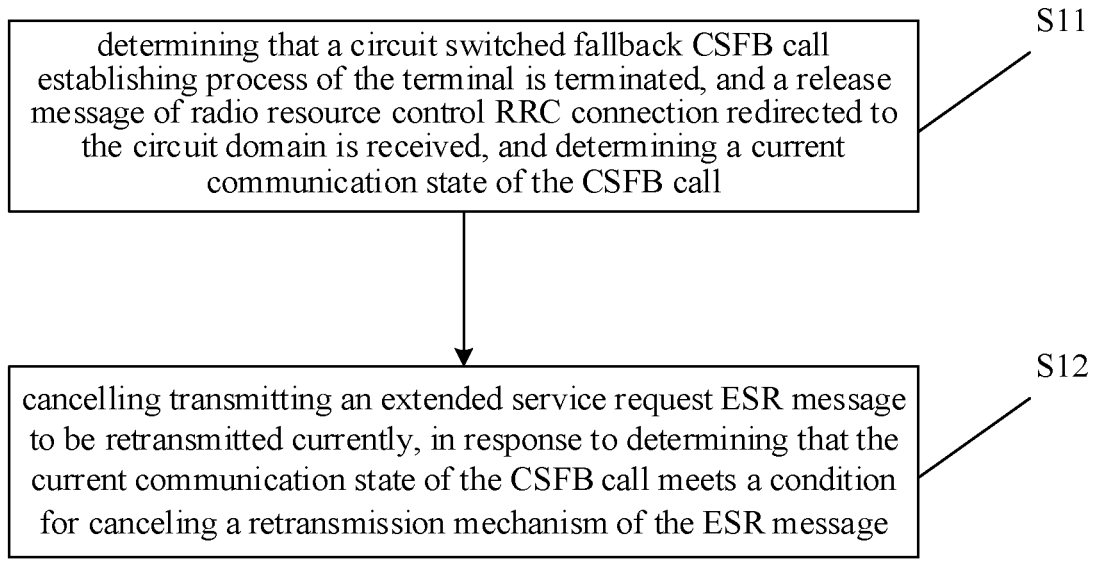
FIG. 2 is a flowchart showing a call processing method according to some embodiments.

FIG. 2 is a flowchart showing a call processing method according to some embodiments. As shown in FIG. 2, the call processing method applied in the UE includes the following steps.

In step S11, it is determined that the CSFB call establishment process performed by the UE is suspended, and a release message of the RRC connection redirected to the circuit domain is received, and the current communication state of the CSFB call is determined.

In step S12, in response to determining that the current communication state of the CSFB call meets a condition for canceling a retransmission mechanism of the ESR message, transmitting an ESR message to be retransmitted currently is cancelled.

In some embodiments of the present disclosure, the UE performs cell registration in a joint registration method. When the UE is registered in LTE and not registered to VoLTE, or the UE does not support VoLTE, or the current PLMN of the UE does not support VoLTE, and when a calling or called occurs, the CSFB call establishment process performed by the UE is detected.

In some embodiments of the present disclosure, when the UE is performing the CSFB call establishment process, if the network transmits an RRC connection reconfiguration message before transmitting an RRC connection release message to instruct the UE to redirect to the CS domain, the UE determines to perform measurement based on the measurement configuration in the RRC connection reconfiguration message to determine a cell with relatively good signal strength. If the UE needs to perform TAU, the TAU process needs to be performed first, and the CSFB call establishment process currently performed by the UE is paused. In other words, the TAU process will suspend the UE's CSFB call establishment process.

In some embodiments of the present disclosure, the UE detects that the CSFB call establishment process is suspended, and after other processes suspending CSFB call establishment process are ended, the UE receives the RRC connection release message sent by the network to determine the current communication state of the CSFB call. Among them, the current communication state of the CSFB call can be any of the following states:

a state where the CSFB call establishment process is suspended, such as a TAU state;

a state where the UE conducts communication in an LTE cell; and a state where the UE falls back to the CS domain to conduct communication in the CS domain cell.

It should be noted that the current communication state of the CSFB call is not limited thereto, and the present disclosure is an illustration, and does not specifically limit the current communication state of the CSFB call.

In response to the current communication state of the CSFB call meeting the condition for canceling the retransmission mechanism of the ESR message, the UE cancels transmitting the ESR message to be retransmitted currently. In response to the current communication state of the CSFB call not meeting the condition for canceling the retransmission mechanism of the ESR message, the UE retains the original retransmission mechanism of the ESR message, and retransmits the ESR message based on the execution operation of the UE to trigger the UE to fall back to the CS domain.

Herein, the RRC connection release message includes the redirected CS domain frequency point. Herein, the redirected CS domain frequency point is used to instruct the UE to fall back to the CS domain. The other processes suspending the CSFB call establishment process may be the TAU process, and they can also be other processing processes. It is an illustration in the present disclosure and is not a specific limitation to the present disclosure.

In the call processing method provided by the present disclosure, the UE can determine to cancel the transmitting of the ESR message to be retransmitted currently, in the CSFB call establishment process, by detecting the current communication state of the CSFB call, such that the problem of the UE falling back to the CS domain again due to repeated transmitting of ESR messages is avoided. After the CSFB call ends, the UE can further enhance the experience of high-speed Internet access by using LTE normally.

In some embodiments, the call processing method applied in the UE can include the following steps.

If it is determined that the current communication state of the CSFB call is in a state of tracking area update (Tracking Area Update Accept), it is determined that the current communication state of the CSFB call meets the conditions for canceling the ESR message retransmission mechanism.

In some embodiments of the present disclosure, as described above, the UE determines the current communication state of the CSFB call after receiving the RRC connection release message sent by the network. In some embodiments of the present disclosure, when the UE determines the current communication state of the CSFB call, if there are other processing processes (such as TAU process) suspending the CSFB call establishment process, the conditions for canceling the ESR message retransmission mechanism can be that the UE is in the TAU state. Herein, the UE can determine, by means of a flag bit, whether there are other processes suspending the CSFB call establishment process through setting the flag bit in advance.

In some embodiments of the present disclosure, in response to the current communication state of the CSFB call being in the TAU state, after the TAU process ends, the RRC connection release message sent by the network is received, and it is determined that the current communication state of the CSFB call meets the condition for cancelling the ESR message retransmission mechanism.

In some embodiments of the present disclosure, for the situation where the CSFB call establishment process performed by the UE is suspended by the TAU process, the Evolved Packet System Mobility Management (ESM) module of the UE's modem (Modem) can be used to set the flag bit (ESM Blocking) for representing the suspension of the CSFB call. The flag bit includes an identifier used to indicate the presence or absence of the suspension of the CSFB call establishment process. The identifier can be True or False. For example, if the identifier in the flag bit is True, it is determined that the CSFB call establishment process is suspended by the TAU process; and if the identifier in the flag bit is False, it is determined that the CSFB call establishment process has not been suspended by the TAU process. The identifier in the flag bit can also be a bit, and different values of the bit indicate the presence or absence of the suspension of the CSFB call establishment process. For example, a value of 0 or 1 is assigned to the flag bit. If the flag bit is 1, it is determined that the CSFB call establishment process is suspended by the TAU process; and if the flag bit is 0, it is determined that the CSFB call establishment process has not been suspended by the TAU process.

Figure 3:
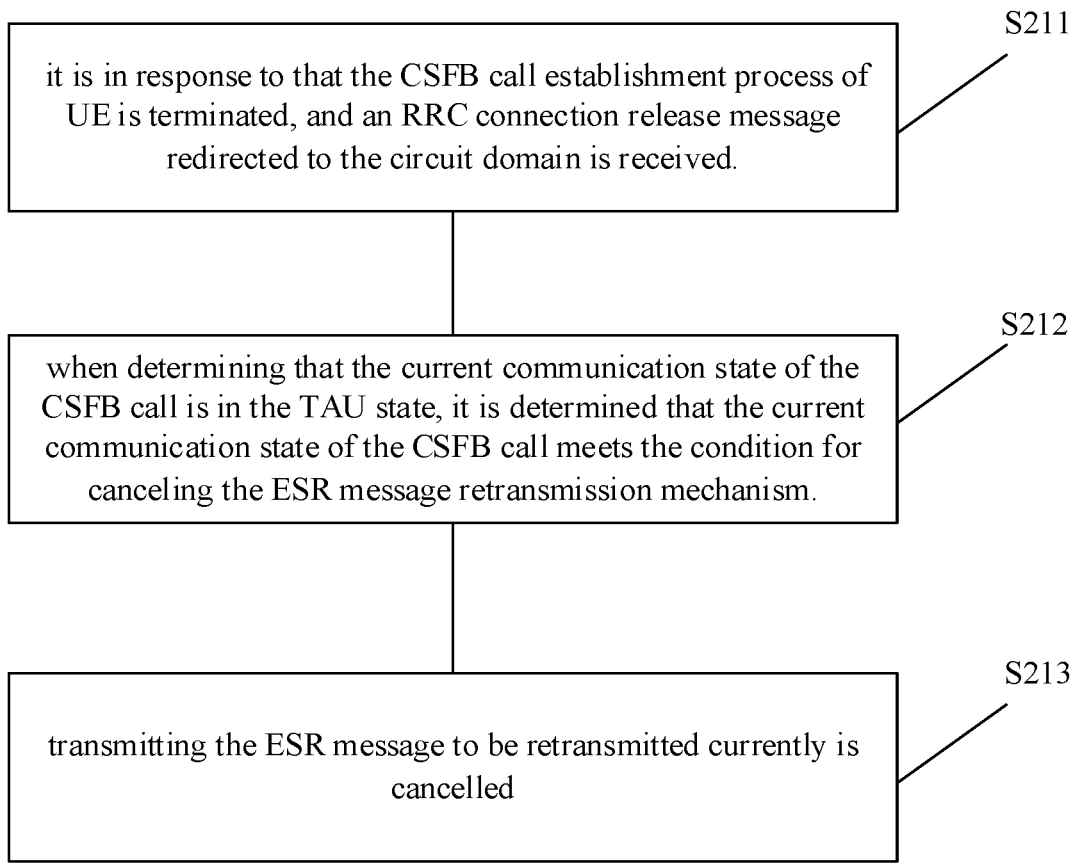
FIG. 3 is a flowchart showing another call processing method according to some embodiments.

In some embodiments of the present disclosure, the step is implemented in combination with the above-mentioned embodiments, and the execution process can be seen in FIG. 3. FIG. 3 is a flowchart showing a call processing method according to some embodiments. As shown in FIG. 3, the call processing method applied in the UE includes the following steps.

In step S211, it is in response to that the CSFB call establishment process performed by the UE is suspended, and an RRC connection release message redirected to the circuit domain is received.

In step S212, if it is determined that the current communication state of the CSFB call is in the TAU state, it is determined that the current communication state of the CSFB call meets the conditions for canceling the ESR message retransmission mechanism.

In step S213, transmitting the ESR message to be retransmitted currently is cancelled.

In the embodiments of the present disclosure, as in the above-mentioned execution steps, the UE detects that the CSFB call establishment process is suspended, and receives the RRC connection release message redirected to the circuit domain, the current communication state of the CSFB call is in the completed TAU, and transmitting the ESR message to be retransmitted currently is cancelled.

In some embodiments, the call processing method applied in the UE can include the following steps.

In response to the presence of a flag bit representing the suspension of the CSFB call, it is determined that the current communication state of the CSFB call is in the TAU state.

In some embodiments of the present disclosure, the UE detects the flag bit set in the ESM module, and if there is an identifier used to determine that the CSFB call establishment process is suspended by the TAU process in the flag bit, the current communication state of the CSFB call can be determined in the TAU state. It can be further determined that if the current communication state of the UE's CSFB call meets the conditions for canceling the ESR message retransmission mechanism, it is determined to cancel transmitting the ESR message to be retransmitted currently.

In some embodiments, the call processing method applied in the UE may include the following steps.

For example, the flag bit representing the suspension of the CSFB call is initialized.

In some embodiments of the present disclosure, as described above, the UE determines an assignment of the flag bit according to the flag bit used to representing the suspension of the CSFB call. In response to the assignment in the flag bit representing that the CSFB call establishment process is suspended by the TAU process, the transmitting of the ESR message to be retransmitted currently is cancelled. Further, after cancelling transmitting the ESR message to be retransmitted currently, the UE determines to clear or reset the assignment in the flag bit to restore it to the initial state.

For example, a value of 0 or 1 is assigned to the flag bit. As mentioned above, if the flag bit is 1, it is determined that the CSFB call establishment process is suspended by the TAU process; if the flag bit is 0, it is determined that the CSFB call establishment process has not been suspended by the TAU process. In response to determining that the value of the flag bit is 1, when the value of the flag bit is assigned 1, after cancelling transmitting the ESR message to be retransmitted currently, the value of the flag bit is restored to 0, or the value of 1 that has been assigned is cleared.

In the call processing method provided in the present disclosure, the UE cancels transmitting the ESR message to be retransmitted currently, which can avoid subsequent retransmission of the ESR message by the UE. The UE initializes the identifier used to represent that the CSFB call establishment process is suspended by the TAU process in a predetermined flag bit, which can be reused in the subsequent CSFB call establishment process, and in the subsequent CSFB call establishment process, the identifier in the flag bit can be assigned a corresponding value according to whether the CSFB call establishment process is suspended by the TAU process.

Figure 4:
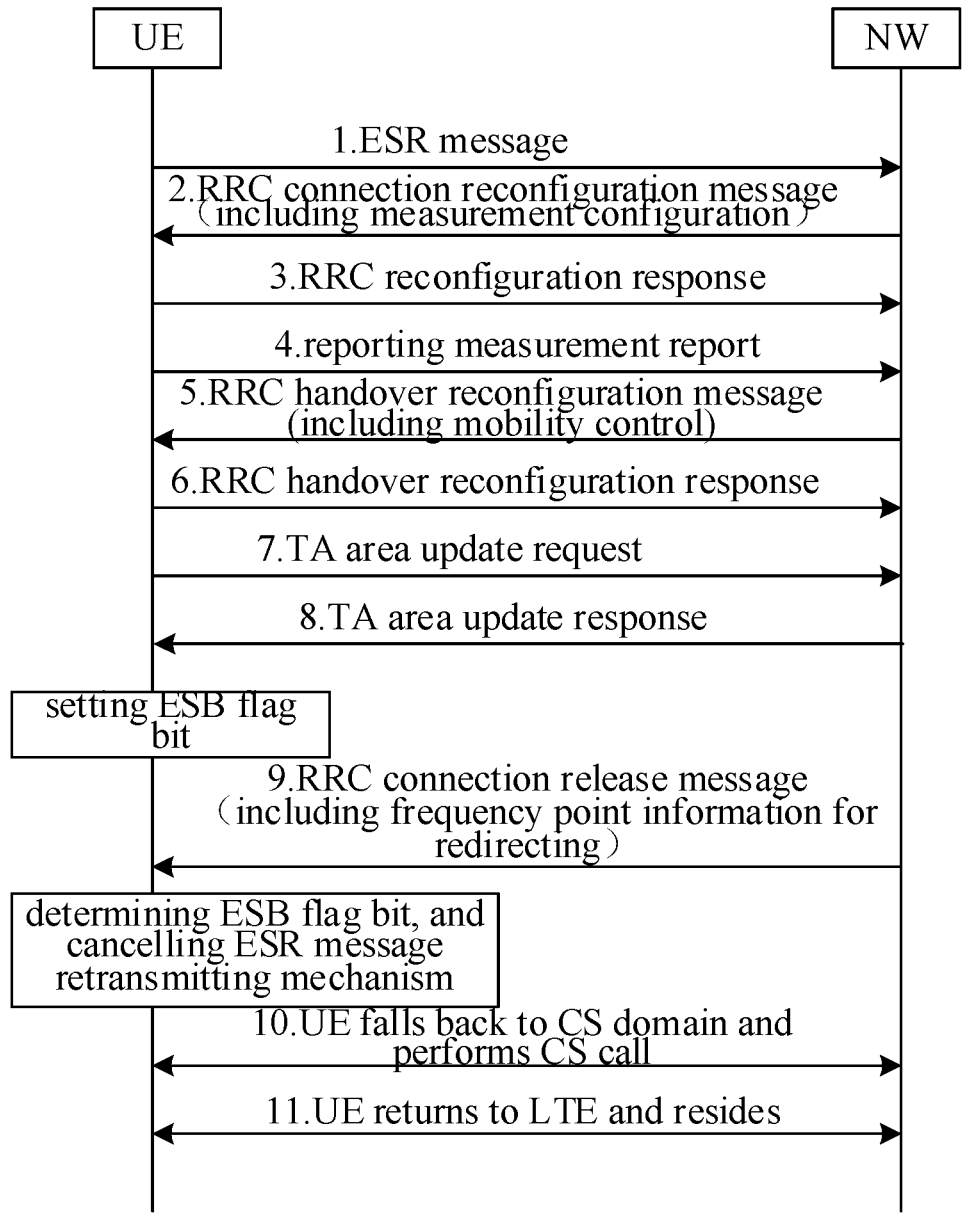
FIG. 4 is an interaction flowchart of a call processing method according to some embodiments.

In some embodiments of the present disclosure, it can be seen in FIG. 4 for the executing process that the UE cancels transmitting the ESR message to be retransmitted currently through the flag bit used to represent the suspension of the CSFB call. FIG. 4 is an interaction flowchart of a call processing method according to some embodiments.

As shown in FIG. 4, steps 1 to 8 can refer to the explanation of FIG. 1 in the foregoing embodiments. Herein, the implementations of operations executed in each of the steps have been described in detail in the embodiments related to the method, and detailed descriptions will not be given here. The UE ends in Tracking Area Update Accept and sets the flag bit to True.

In step 9, the network transmits RRC Connection Release (redirected Carrier Info). The RRC Connection Release (redirected Carrier Info) issued by the network contains the frequency point information of the redirection to the CS domain.

After receiving the RRC Connection Release (redirected Carrier Info), the UE recognizes the flag bit, and if the flag bit is True, it determines to cancel transmitting the ESR message to be retransmitted currently.

In step 10, the UE falls back to the CS domain and executes the call process in the CS domain.

In step 11, the UE returns to LTE again and resides, after the CS domain call ends.

In some embodiments, the call processing method applied in the UE can include the following steps.

For example, when detecting that the radio access technology (Radio Access Technology, RAT) is switched from LTE to the CS domain, and the ESR message is in the retransmission state, it is determined that the current communication state of the CSFB call meets the condition of canceling the ESR message retransmission mechanism.

In some embodiments of the present disclosure, as described above, the UE determines the current communication state of the CSFB call after receiving the RRC connection release message sent by the network. In some embodiments of the present disclosure, according to the changing situation of the UE RAT, determining the conditions for cancelling the ESR message retransmission mechanism can also be that the UE RAT is switched from LTE to the CS domain.

In some embodiments of the present disclosure, in response to the UE RAT switching from LTE to CS domain, in other words, if the UE determines that the RAT has changed and the ESR message is in the retransmission state in the case that the UE has fallen back to the CS domain, it is determined that the current communication state of the CSFB call meets the conditions for canceling the ESR message retransmission mechanism. It can be further determined that the transmitting of the ESR message to be retransmitted currently is cancelled.

Figure 5:
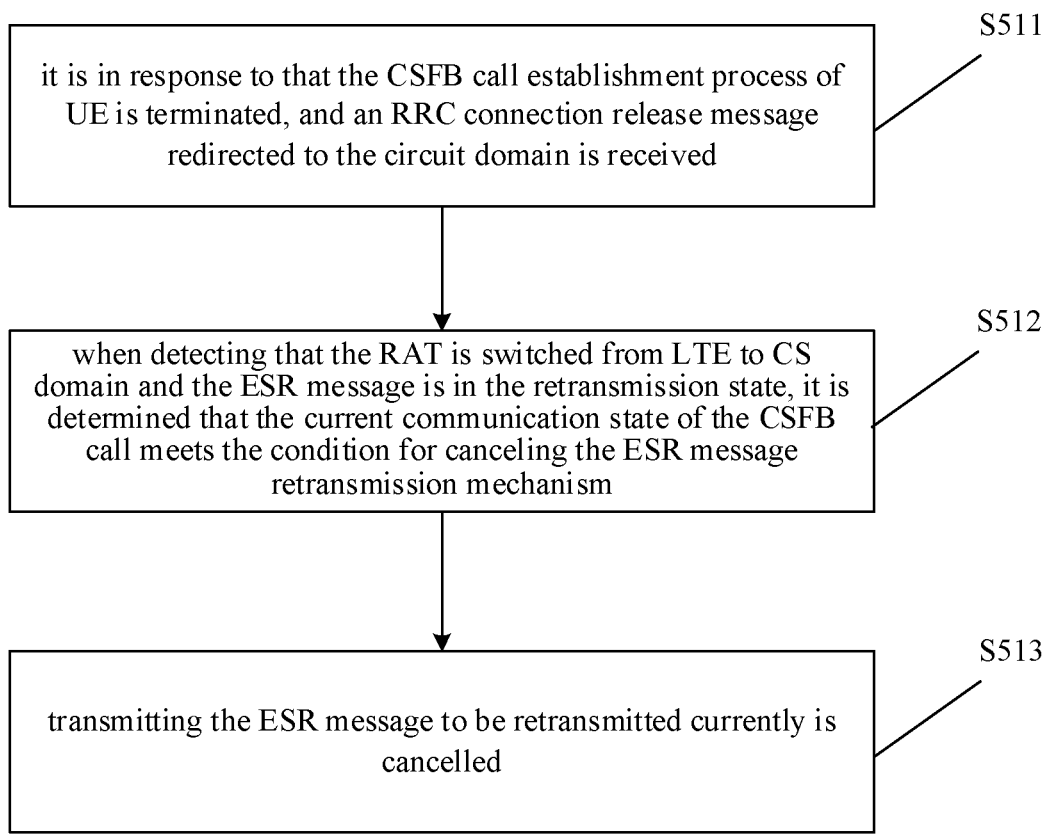
FIG. 5 is a flowchart showing another call processing method according to some embodiments.

In some embodiments of the present disclosure, the step is implemented in combination with the above-mentioned embodiments, and the execution process can be seen in FIG. 5. FIG. 5 is a flowchart showing a call processing method according to some embodiments. As shown in FIG. 5, the call processing method applied in the UE includes the following steps.

In step S511, it is in response to that the CSFB call establishment process performed by the UE is suspended, and an RRC connection release message redirected to the circuit domain is received.

In step S512, when detecting that the RAT is switched from LTE to the CS domain and the ESR message is in the retransmission state, it is determined that the current communication state of the CSFB call meets the conditions for canceling the ESR message retransmission mechanism.

In step S513, transmitting the ESR message to be retransmitted currently is cancelled.

In some embodiments of the present disclosure, as in the above-mentioned execution steps, the UE detects that the CSFB call establishment process is suspended, and receives the RRC connection release message redirected to the circuit domain, and detects that the RAT is switched from LTE to CS domain, and the ESR message is in the retransmission state, the transmitting of the ESR message to be retransmitted currently is cancelled.

Figure 6:
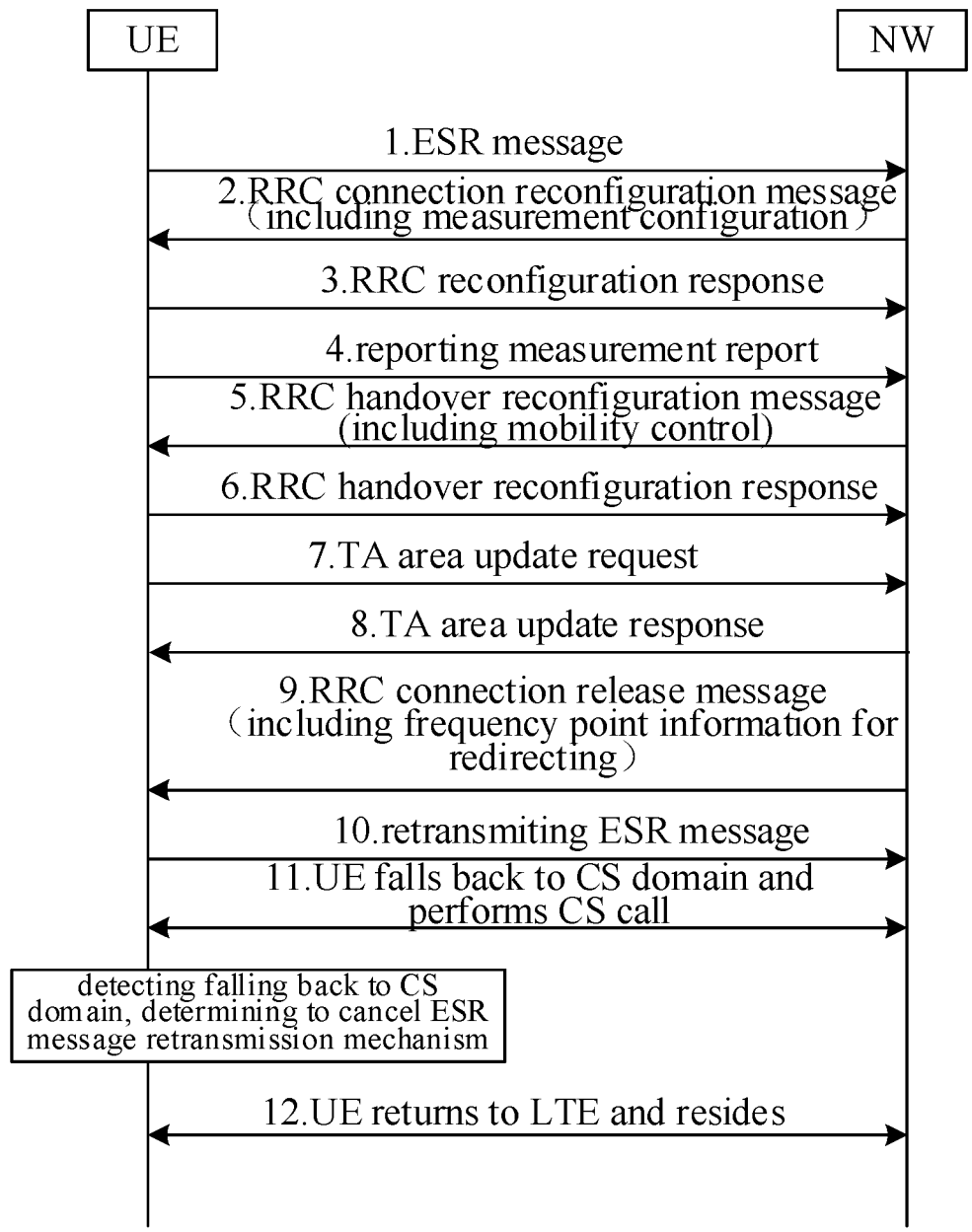
FIG. 6 is an interaction flowchart showing another call processing method according to some embodiments.

In some embodiments of the present disclosure, the UE changes through the RAT, and has fallen back to the CS domain, and the executing process for determining to cancel the transmitting of the ESR message to be retransmitted currently can be seen in FIG. 6. FIG. 6 is an interaction flowchart showing a call processing method according to some embodiments.

As shown in FIG. 6, steps 1 to 11 can refer to the explanation of FIG. 1 in the foregoing embodiments. Herein, the implementations of operations executed in each of the steps have been described in detail in the embodiments related to the method, and detailed explanations will not be given here.

The UE executes step 11, and determines the situation where the RAT has changed, determines that the RAT is switched from LTE to the CS domain, and the ESR message is in the retransmission state, and cancels transmitting the ESR message to be retransmitted currently.

In step 12, the UE returns to LTE again and resides, after the CS domain call ends.

In some embodiments of the present disclosure, during the CSFB call establishment process performed by the UE, if the CSFB call establishment process is suspended, in one way, after the UE receives the RRC connection release message, it can be determined to cancel transmitting the ESR message to be retransmitted currently by the flag bit used to represent the CSFB call suspension. In one way, after receiving the RRC connection release message, the UE determines that the UE RAT is switched from LTE to the CS domain, and the ESR message is in the retransmission state, and then cancels transmitting the ESR message to be retransmitted currently. Through any one of the two implementations provided in the present disclosure, the retransmission mechanism of the ESR message can be cancelled to prevent the problem that the UE falls back to the CS domain multiple times during one CSFB call establishment process due to the UE repeatedly transmitting the ESR message. Thus it can be realized that, after the CSFB call ends, the UE can improve the experience effect of high-speed Internet access by using LTE normally.

Based on the similar concept, the embodiments of the present disclosure further provide a call processing apparatus.

It can be understood that, in order to implement the above-mentioned functions, the call processing apparatus provided by the embodiments of the present disclosure includes hardware structures and/or software modules corresponding to each function. In combination with the units and algorithm steps of the examples disclosed in the embodiments of the present disclosure, the embodiments of the present disclosure can be implemented in the form of hardware or a combination of hardware and computer software. Whether a certain function is executed by hardware or computer software-driven hardware depends on the specific application and design constraint conditions of the technical solution. Those skilled in the art can use different methods for each specific application to implement the described functions, but such implementation should not be considered as going beyond the scope of the technical solutions of the embodiments of the present disclosure.

Figure 7:
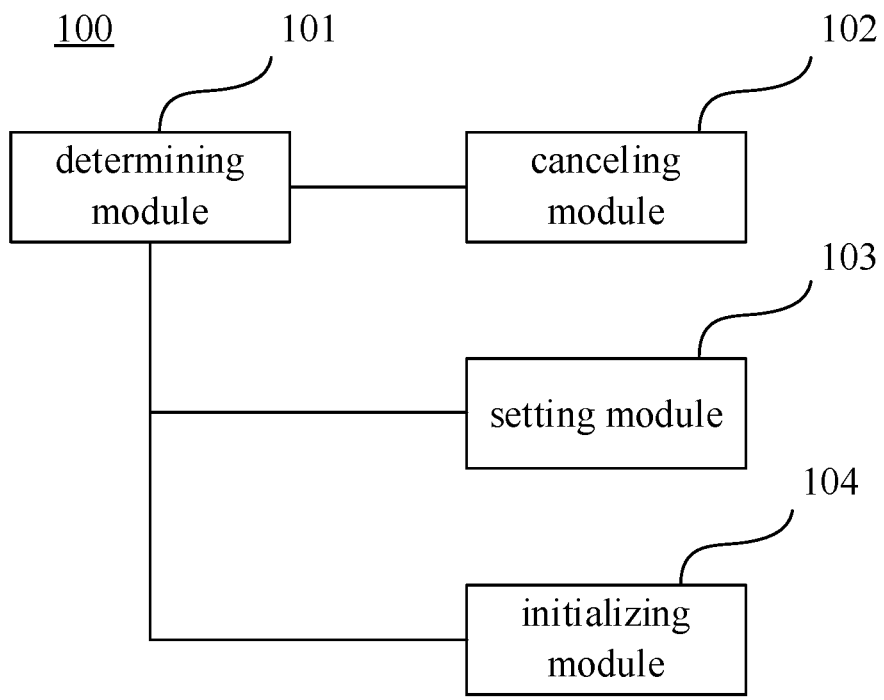
FIG. 7 is a block diagram showing a call processing apparatus according to some embodiments.

FIG. 7 is a block diagram showing a call processing apparatus according to some embodiments. Referring to FIG. 7, the call processing apparatus 100 includes a determining module 101 and a canceling module 102.

The determining module 101 is configured to determine that a circuit switched fallback CSFB call establishing process performed by the UE is suspended, and a release message of radio resource control RRC connection redirected to the circuit domain is received, and to determine a current communication state of the CSFB call. The canceling module 102 is configured to cancel transmitting an extended service request ESR message to be retransmitted currently, in response to determining that the current communication state of the CSFB call meets a condition for canceling a retransmission mechanism of the ESR message.

In the embodiments of the present disclosure, the determining module 101 is configured to determine that the current communication state of the CSFB call meets the conditions for canceling the ESR message retransmission mechanism, when determining that the current communication state of the CSFB call is in a state of tracking area update TAU.

In the embodiments of the present disclosure, the call processing apparatus further includes: a setting module 103.

The setting module 103 is configured to set a flag bit for representing the suspension of the CSFB call, when the CSFB call establishing process performed by the UE is suspended by a process of the TAU.

The determining module 101 is configured to determine that the current communication state of the CSFB call is in the state of the TAU, in response to the presence of the flag bit for representing the suspension of the CSFB call.

In the embodiment of the present disclosure, after canceling the transmitting of the ESR message to be retransmitted currently, the call processing apparatus further includes: an initializing module 104.

The initializing module 104 is configured to initialize the flag bit for representing the suspension of the CSFB call.

In the embodiments of the present disclosure, the determining module 101 is configured to determine that the current communication state of the CSFB call meets the conditions for canceling the ESR message retransmission mechanism, when detecting that a radio access technology RAT is switched from a long-term evolution LTE to the CS domain, and the ESR message is in a retransmission state.

With respect to the apparatuses in the above embodiments, the specific manners for performing operations for individual modules have been described in detail in the embodiments related to the method, which will not be elaborated herein.

Figure 8:
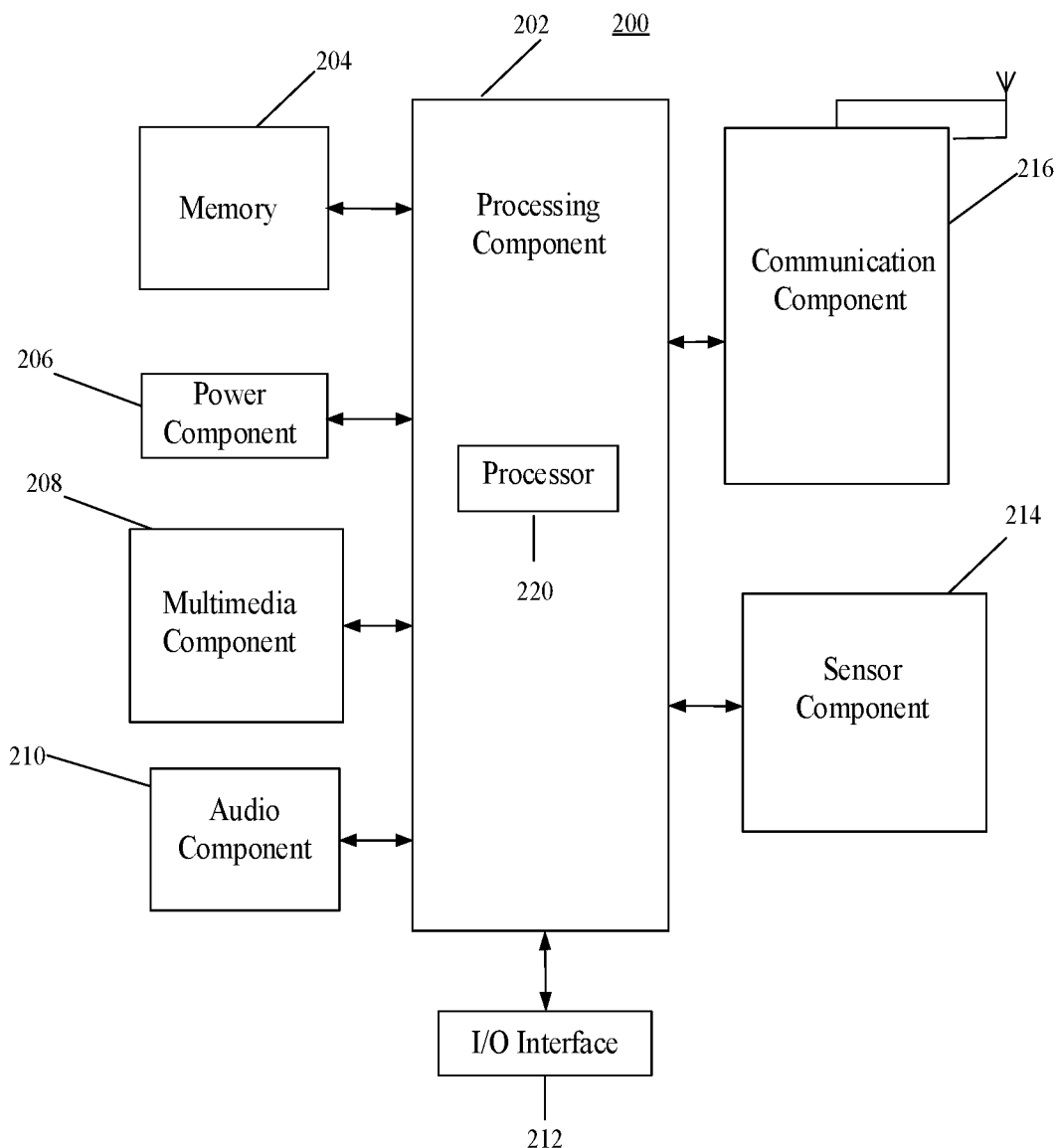
FIG. 8 is a block diagram showing an apparatus for call processing according to some embodiments.

FIG. 8 is a block diagram of an apparatus 200 for call processing, according to some embodiments. For example, the apparatus 200 can be a mobile phone, a computer, a digital broadcast terminal, a messaging apparatus, a gaming console, a tablet, a medical apparatus, exercise equipment, a personal digital assistant, and the like.

Referring to FIG. 8, the apparatus 200 can include one or more of the following components: a processing component 202, a memory 204, a power component 206, a multimedia component 208, an audio component 210, an input/output (I/O) interface 212, a sensor component 214, and a communication component 216.

The processing component 202 typically controls overall operations of the apparatus 200, such as the operations associated with display, telephone calls, data communications, camera operations, and recording operations. The processing component 202 can include one or more processors 220 to execute instructions to perform all or part of the steps in the above described methods. Moreover, the processing component 202 can include one or more modules which facilitate the interaction between the processing component 202 and other components. For instance, the processing component 202 can include a multimedia module to facilitate the interaction between the multimedia component 208 and the processing component 202.

The memory 204 is configured to store various types of data to support the operation of the apparatus 200. Examples of such data include instructions for any applications or methods operated on the apparatus 200, contact data, phonebook data, messages, pictures, video, etc. The memory 204 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 206 provides power to various components of the apparatus 200. The power component 206 can include a power management system, one or more power sources, and any other components associated with the generation, management, and distribution of power in the apparatus 200.

The multimedia component 208 includes a screen providing an output interface between the apparatus 200 and the user. In some embodiments, the screen can include a liquid crystal display (LCD) and a touch panel (TP). In some implementations, an organic light-emitting diode (OLED) display can be employed.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 208 includes a front camera and/or a rear camera. The front camera and the rear camera can receive an external multimedia datum while the apparatus 200 is in an operation mode, such as a photographing mode or a video mode. Each of the front camera and the rear camera can be a fixed optical lens system or have focus and optical zoom capability.

The audio component 210 is configured to output and/or input audio signals. For example, the audio component 210 includes a microphone ("MIC") configured to receive an external audio signal when the apparatus 200 is in an operation mode, such as a call mode, a recording mode, and a voice recognition mode. The received audio signal can be further stored in the memory 204 or transmitted via the communication component 216. In some embodiments, the audio component 210 further includes a speaker to output audio signals.

The I/O interface 212 provides an interface between the processing component 202 and peripheral interface modules, such as a keyboard, a click wheel, buttons, and the like. The buttons can include, but are not limited to, a home button, a volume button, a starting button, and a locking button.

The sensor component 214 includes one or more sensors to provide state assessments of various aspects of the apparatus 200. For instance, the sensor component 214 can detect an open/closed state of the apparatus 200, relative positioning of components, e.g., the display and the keypad, of the apparatus 200, a change in position of the apparatus 200 or a component of the apparatus 200, a presence or absence of user contact with the apparatus 200, an orientation or an acceleration/deceleration of the apparatus 200, and a change in temperature of the apparatus 200. The sensor component 214 can include a proximity sensor configured to detect the presence of nearby objects without any physical contact. The sensor component 214 can also include a light sensor, such as a CMOS or CCD image sensor, for use in imaging applications. In some embodiments, the sensor component 214 can also include an accelerometer sensor, a gyroscope sensor, a magnetic sensor, a pressure sensor, or a temperature sensor.

The communication component 216 is configured to facilitate communication, wired or wirelessly, between the apparatus 200 and other devices. The apparatus 200 can access a wireless network based on a communication standard, such as Wi-Fi, 2G, 3G, 4G, 5G or a combination thereof. In one exemplary embodiment, the communication component 216 receives a broadcast signal or broadcast associated information from an external broadcast management system via a broadcast channel. In one exemplary embodiment, the communication component 216 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 200 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 204, executable by the processor 220 in the apparatus 200, for performing the above-described methods. For example, the non-transitory computer-readable storage medium can be a ROM, a RAM, a CD-ROM, a magnetic tape, a floppy disc, an optical data storage apparatus, and the like.

Various embodiments of the present disclosure can have the following advantages: the UE can detect the current communication state of the CSFB call when the CSFB call establishment process is suspended during the CSFB call establishment process, and when the current communication state of the CSFB call meets a condition for canceling the transmitting of the current ESR message to be retransmitted, the transmitting of the current ESR message to be retransmitted is canceled. The present disclosure avoids the situation that the UE falls back to the CS domain multiple times during one CSFB call establishment process due to repeatedly transmitting the ESR message, thereby ensuring that the UE normally uses service data in terms of the LTE.

It can be understood that the "multiple" in the disclosure means two or more, and other quantifiers are similar. "And/or" describes the relationship of the related objects, indicating that there may be three relationships, for example, A and/or B may indicate three cases: A exists alone, A and B exist simultaneously, and B exists alone. The character "/" generally indicates that the relationship between the contextually relevant objects is a "or" relationship. The singular forms "a," "an," "said," and "the" are also intended to include the plural forms unless the context clearly indicates otherwise.

It can be further understood that although the terms such as "first" and "second" and the like are used to describe various information, these information should not be limited by these terms. The terms are only used to distinguish the same type of information from each other, and do not indicate a specific order or importance. In fact, the expressions such as "first" and "second" and the like can be used interchangeably. For instance, first information can also be referred to as second information without departing from the scope of the disclosure, and similarly, the second information can also be referred to as the first information.

It can be further understood that, unless otherwise specified, "connection" includes a direct connection between the two without other components, and also includes an indirect connection between the two with other elements.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A call processing method, applied to a terminal, the call processing method comprising:
   determining that a circuit switched fallback (CSFB) call establishing process performed by the terminal is suspended, and a release message of radio resource control (RRC) connection redirected to a circuit domain is received, and determining a current communication state of the CSFB call; and
   cancelling transmitting an extended service request (ESR) message to be retransmitted currently, in response to determining that the current communication state of the CSFB call meets a condition for canceling a retransmission mechanism of the ESR message.

2. The call processing method of claim 1, wherein the determining that the current communication state of the CSFB call meets the condition for canceling the retransmission mechanism of the ESR message comprises:
when determining that the current communication state of the CSFB call is in a state of tracking area update, determining that the current communication state of the CSFB call meets the conditions for canceling the ESR message retransmission mechanism.

3. The call processing method of claim 2, wherein the call processing method further comprises:
when the CSFB call establishing process performed by the terminal is suspended by a process of tracking area update, setting a flag bit for representing the suspension of the CSFB call; and
the determining that the current communication state of the CSFB call is in the state of tracking area update comprises:
determining that the current communication state of the CSFB call is in the state of tracking area update, in response to the presence of the flag bit for representing the suspension of the CSFB call.

4. The call processing method of claim 3, wherein after said cancelling transmitting the ESR message to be retransmitted currently, the call processing method further comprises:
initializing the flag bit for representing the suspension of the CSFB call.

5. The call processing method of claim 1, wherein the determining that the current communication state of the CSFB call meets the condition for canceling the retransmission mechanism of the ESR message comprises:
when detecting that a radio access technology RAT is switched from a long-term evolution to the circuit domain, and the ESR message is in a retransmission state, determining that the current communication state of the CSFB call meets the condition for canceling the ESR message retransmission mechanism.

6. The call processing method of claim 1, wherein the call processing method further comprises: when the terminal is registered in LTE and not registered to VoLTE, or the terminal does not support VoLTE, or the current PLMN of the terminal does not support VoLTE, and when a calling or called occurs, detecting the CSFB call establishment process of the terminal.

7. The call processing method of claim 1, wherein the current communication state of the CSFB call are any of the following states:
a state where the CSFB call establishment process is suspended, such as a TAU state;
a state where the terminal conducts communication in an LTE cell; and
a state where the terminal falls back to the CS domain to conduct communication in the CS domain cell.

8. The call processing method of claim 1, wherein the call processing method further comprises: in response to the current communication state of the CSFB call not meeting the condition for canceling the retransmission mechanism of the ESR message, retaining the original retransmission mechanism of the ESR message, and retransmitting the ESR message based on the execution operation of the terminal to trigger the terminal to fall back to the CS domain by the terminal.

9. The call processing method of claim 1, wherein the call processing method further comprises: in response to the current communication state of the CSFB call being in the TAU state, after the TAU process ends, the RRC connection release message sent by the network is received, determining that the current communication state of the CSFB call meets the condition for cancelling the ESR message retransmission mechanism.

10. The call processing method of claim 1, wherein the call processing method further comprises: after cancelling transmitting the ESR message to be retransmitted currently, determining, by the terminal, to clear or reset the assignment in the flag bit to restore it to the initial state.

11. A call processing apparatus, comprising:
a processor; and
a memory device for storing processor-executable instructions;
wherein the processor is configured to:
determine that a circuit switched fallback (CSFB) call establishing process performed by the terminal is suspended, and a release message of radio resource control (RRC) connection redirected to a circuit domain is received, and determining a current communication state of the CSFB call; and
cancel transmitting an extended service request (ESR) message to be retransmitted currently, in response to determining that the current communication state of the CSFB call meets a condition for canceling a retransmission mechanism of the ESR message.

12. The call processing apparatus of claim 11, wherein the processor is further configured to:
determining that the current communication state of the CSFB call meets the conditions for canceling the ESR message retransmission mechanism, when determining that the current communication state of the CSFB call is in a state of tracking area update.

13. The call processing method of claim 12, wherein the processor is further configured to:
set a flag bit for representing the suspension of the CSFB call, when the CSFB call establishing process performed by the terminal is suspended by a process of tracking area update; and
determine that the current communication state of the CSFB call is in the state of tracking area update, in response to the presence of the flag bit for representing the suspension of the CSFB call.

14. The call processing method of claim 13, wherein the processor is further configured to:
initialize the flag bit for representing the suspension of the CSFB call.

15. The call processing method of claim 11, wherein the processor is further configured to:
determine that the current communication state of the CSFB call meets the condition for canceling the ESR message retransmission mechanism, when detecting that a radio access technology RAT is switched from a long-term evolution to the circuit domain, and the ESR message is in a retransmission state.

16. A non-transitory computer-readable storage medium having stored therein instructions that, when executed by a processor of a terminal, enabling the terminal to execute a call processing method comprising:
determining that a circuit switched fallback (CSFB) call establishing process performed by the terminal is suspended, and a release message of radio resource control (RRC) connection redirected to a circuit domain is received, and determining a current communication state of the CSFB call; and
cancelling transmitting an extended service request (ESR) message to be retransmitted currently, in response to determining that the current communication state of the CSFB call meets a condition for canceling a retransmission mechanism of the ESR message.

17. The storage medium of claim 16, wherein the determining that the current communication state of the CSFB call meets the condition for canceling the retransmission mechanism of the ESR message comprises:

when determining that the current communication state of the CSFB call is in a state of tracking area update, determining that the current communication state of the CSFB call meets the conditions for canceling the ESR message retransmission mechanism.

18. The storage medium of claim 17, wherein the call processing method further comprises:

when the CSFB call establishing process performed by the terminal is suspended by a process of tracking area update, setting a flag bit for representing the suspension of the CSFB call; and the determining that the current communication state of the CSFB call is in the state of tracking area update comprises:

determining that the current communication state of the CSFB call is in the state of tracking area update, in response to the presence of the flag bit for representing the suspension of the CSFB call.

19. The storage medium of claim 18, wherein after said cancelling transmitting the ESR message to be retransmitted currently, the call processing method further comprises:

initializing the flag bit for representing the suspension of the CSFB call.

20. The storage medium of claim 16, wherein the determining that the current communication state of the CSFB call meets the condition for canceling the retransmission mechanism of the ESR message comprises:

when detecting that a radio access technology RAT is switched from a long-term evolution to the circuit domain, and the ESR message is in a retransmission state, determining that the current communication state of the CSFB call meets the condition for canceling the ESR message retransmission mechanism.

\* \* \* \* \*